Oct. 16, 1951  M. S. MEAKER  2,571,275
SELECTIVE FEEDER FOR WILD BIRDS
Filed Feb. 25, 1949
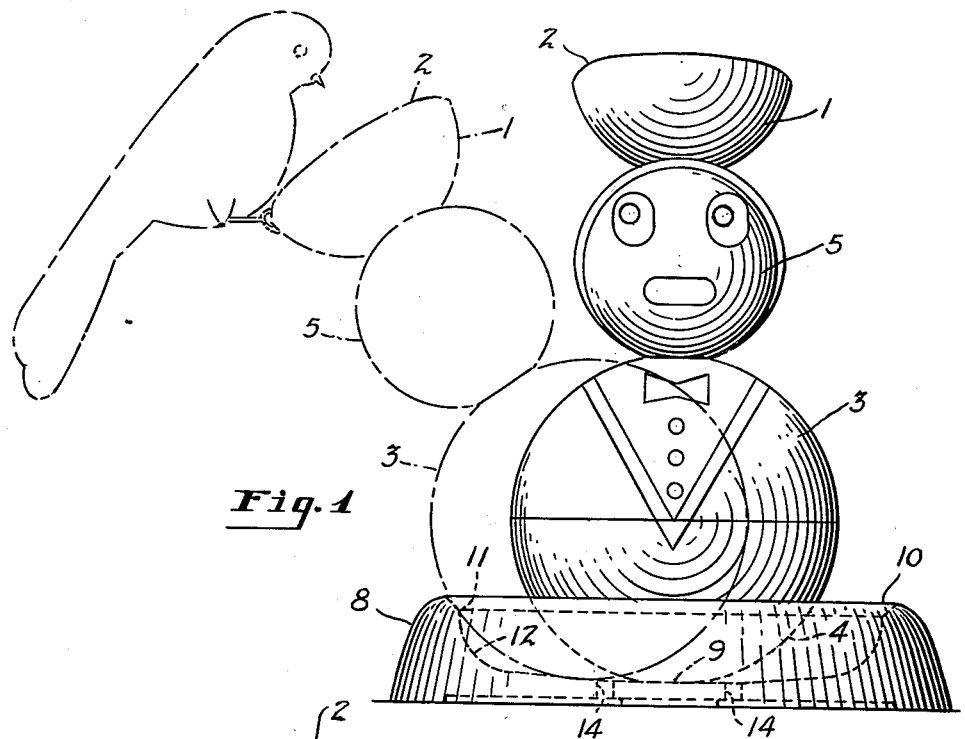
*Fig. 1*
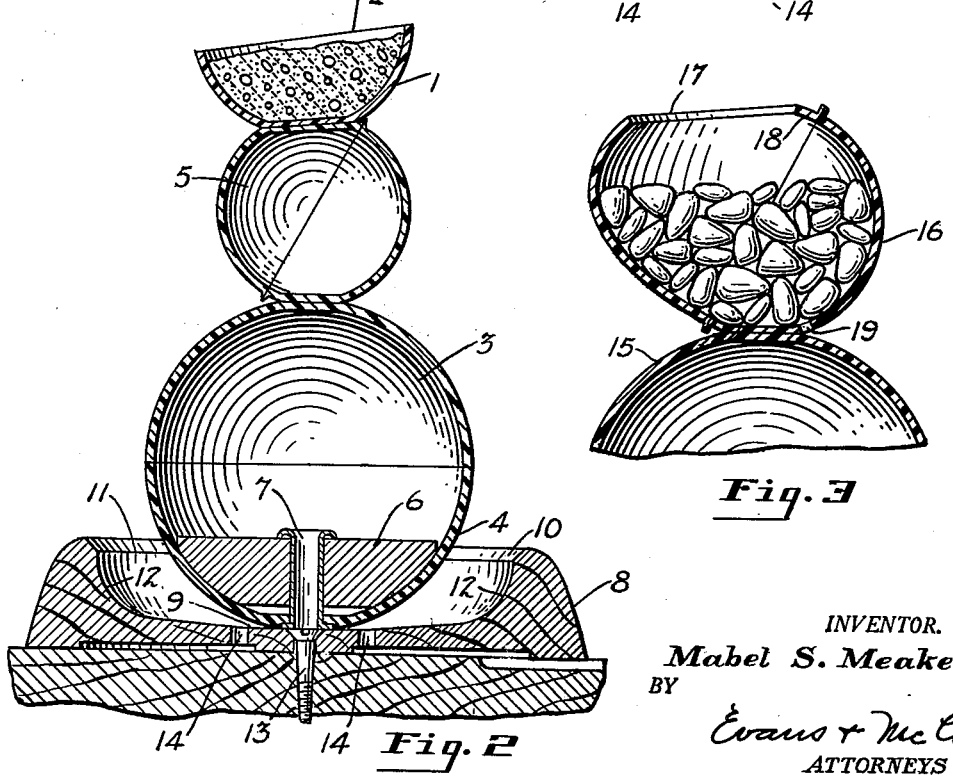
*Fig. 2*
*Fig. 3*
INVENTOR.
Mabel S. Meaker
BY
Evans + McCoy
ATTORNEYS Patented Oct. 16, 1951

2,571,275

UNITED STATES PATENT OFFICE 2,571,275

SELECTIVE FEEDER FOR WILD BIRDS

Mabel S. Meaker, Euclid Ohio

Application February 25, 1949, Serial No. 78,410

5 Claims. (Cl. 119—51)

This invention relates to feeders for wild birds and has for its object to provide a feeder that is selective in that certain undesirable species of wild birds are unable to feed from it.

A bothersome problem arises in connection with the feeding of birds with feeders such as heretofore commonly used due to the fact that English sparrows congregating in large numbers take most if not all of the food, driving away the more desirable native birds.

It is an object of the present invention to provide a feeder which provides an insecure support for the birds while feeding so that only the most agile and intrepid birds are able to use it, thereby excluding the more awkward and more timid birds such as English sparrows. English sparrows are clumsy, wary and easily alarmed, whereas certain small native birds such as black capped chickadees and the tufted titmouse are acrobatic and adventurous and accustomed to perch in precarious positions while feeding in their natural habitat.

The present invention provides a feeder that moves bodily when subjected to the weight of the bird, providing a precarious perch to which the more active and adventurous birds will cling, but which will frustrate the clumsier and more timid birds such as English sparrows, thereby not only providing a device for effectively excluding undesirable birds, but also causing the birds to furnish delightful entertainment while feeding.

Reference should be had to the accompanying drawings forming a part of this specification in which:

Figure 1 is a front elevation of a feeder embodying the invention, showing in dotted lines a position to which the feeder may be moved by the weight of a bird alighting thereon;

Fig. 2 is a vertical section centrally through the feeder; and

Fig. 3 is a fragmentary section showing a modified form of food receptacle.

The feeder of the present invention comprises a food receptacle such as the food receptacle 1 shown in Figs. 1 and 2 that is adapted to contain a suitable quantity of food for birds and that is provided with a rim portion 2 upon which a bird may perch while feeding. In accordance with the present invention the receptacle 1 is so mounted that it will be moved bodily from the position in which it is normally poised by the weight of a bird alighting on the rim 2. Various forms of rocking supports may be provided, but a support of the roly-poly type is preferred.

As shown in Figs. 1 and 2, the receptacle 1 is supported upon a roly-poly figure which has a hollow body 3 with a base 4 which is smooth and of spherical contour. A hollow head 5 may be secured by suitable means to the top of the body 3, and the receptacle 1 may be secured to the top of the head 5. As is common practice, the roly-poly figure has its weight so disposed that its center of gravity is adjacent the base 4 and the receptacle 1 is so positioned on the head 5 that the feeder comprising the roly-poly figure and attached receptacle is normally poised in static equilibrium in a position such that the weight of a bird perched on the receptacle will rock the feeder. The rim portion of the receptacle upon which the weight of the bird is imposed must be laterally offset with respect to the vertical line through the center of gravity of the feeder, and with an open top receptacle such as shown in Figs. 1 and 2, the said vertical line is within the rim 2 of the receptacle. In order to bring the center of gravity into the base portion of the roly-poly a weight 6 is preferably mounted within the base portion of the hollow body 3 and is secured in place by suitable means such as a rivet 7.

Since the center of gravity of the feeder is close to the base 4 upon which it is rockably supported, and since the rim 2 upon which a bird may perch is laterally offset with respect to the vertical line through the center of gravity, but little force is required to move the feeder from its poised position, and the weight of a small bird imposed upon the rim portion of the receptacle 1 will be sufficient to cause the feeder to rapidly swing to a position such as shown in dotted lines in Fig. 1. This movement of the feeder frightens the more timid birds such as English sparrows, but does not prevent more adventurous birds such as the chickadees from utilizing the feeder.

The feeder may be placed upon any level surface upon which it will rock freely, but it is usually preferable to mount the feeder in a retainer which has a shape similar to a saucer, the retainer having a substantially flat and smooth bottom 9 upon which the base 4 of the feeder may roll and slide, and a retaining rim 10 that is provided with an inner edge portion 11 against which the base portion 4 of the feeder engages when the feeder is rolled in any direction from its upright position. An inner wall 12 of the rim 10 is preferably formed on a radius of curvature less than that of the base 4 so that the base 4 has point contact with the edge 11 of the rim so that after the feeder has been tilted by the weight of a bird perched on the rim 2, the base 4 may roll and slide upon the edge 11, making it necessary for the bird to cling to the receptacle rim and rock with the receptacle while feeding. The feeder will have a lively, bobbing movement when subjected to wind and while supporting the weight of a bird engaged in feeding from the receptacle, and the antics of the birds in attempting to gain a footing on the precarious perch provided by the feeder and in retaining their foothold while feeding, provides a very novel and interesting spectacle.

The retaining saucer 8, which may be made of any suitable material such as wood or plastic, may be secured to a window ledge, fence rail or supporting post by suitable means such as a screw 13, and drain openings 14 may be provided in the bottom of the saucer.

The receptacle 1 shown in Figs. 1 and 2 is adapted to receive a food preparation in the form of a paste which will not be displaced by the rocking movements of the feeder. In Fig. 3 there is shown a modified form of receptacle which is adapted to retain loose feed such as seeds. In Fig. 3, the body 15 of the roly-poly has a receptacle 16 attached thereto which may also form the head of the roly-poly. The receptacle 16 has a rim 17 upon which the birds may perch around an opening in the top below which there is an inwardly curved portion 18 which serves to retain the loose material in the receptacle when the receptacle is tilted. The receptacle 16 may be provided with one or more drain openings 19 adjacent the body thereof so that the receptacle will not fill with water during a rain.

The feeder may be formed of any suitable weather-resistant material, preferably a durable non-frangible plastic composition.

In both modifications the feeder is normally poised with the rim of the receptacle offset laterally with respect to a vertical line through the center of gravity, and the weight of the feeder is so disposed that the center of gravity is but slightly raised upon rocking movements, the feeder being thus delicately poised so that it will readily rock through a considerable angle and will be held against the edge 11 of the retaining saucer by the weight of the bird perched on the rim of the receptacle. Furthermore, by reason of the point contact with the edge 11 of the rim, the feeder will have rocking movements when in its inclined position due to shifting of the weight of a bird as it pecks at the food in the receptacle, so that the feeder can be used only by the more acrobatic and adventurous birds who are able to cling tenaciously to the rim of the receptacle while feeding.

It is to be understood that in accordance with the provisions of the patent statutes, variations and modifications of the specific devices herein shown and described may be made without departing from the spirit of the invention.

What I claim is:

1. A selective feeder for small wild birds comprising a balanced laterally rockable supporting member and a food receptacle mounted on and movable with said member, said feeder being normally delicately poised in a substantially predetermined position with respect to a vertical line through its center of gravity and said receptacle having a rim portion forming a bird perch laterally offset with respect to said vertical line, whereby the feeder is adapted to be rocked from its poised position by the weight of a small wild bird alighting on the rim of said receptacle.

2. A selective feeder for small wild birds comprising a supporting member having a rounded bottom upon which it freely rocks and a food receptacle mounted on and movable with said member, said feeder having its center of gravity disposed closely adjacent said bottom to normally delicately poise said feeder in a substantially predetermined position with respect to a vertical line through its center of gravity and said receptacle having a rim portion forming a bird perch laterally offset with respect to said vertical line, whereby the feeder is adapted to be rocked from its poised position by the weight of a bird alighting on the rim of said receptacle.

3. A selective feeder for small wild birds comprising a roly-poly having a top portion shaped to provide a food receptacle with a rim portion upon which a bird may perch and also having a rounded base portion that is weighted to bring the center of gravity close to said base and delicately poise the feeder in a position in which a vertical line through its center of gravity is laterally offset with respect to said rim portion, whereby the feeder is adapted to be rocked by the weight of a small wild bird alighting on said rim portion.

4. A selective feeder for small wild birds comprising a roly-poly having a hollow body portion with a base of spherical contour and also having a top portion formed to provide a food receptacle with a rim portion upon which a bird may perch, and a weight within said hollow body adjacent the base to bring the center of gravity close to said base and delicately poise said feeder in a position in which a vertical line through the center of gravity of the feeder is laterally offset with respect to said rim portion, whereby the feeder is adapted to be rocked by the weight of a small wild bird alighting on said rim portion.

5. A selective feeder for small wild birds comprising a roly-poly having a top portion shaped to provide a food receptacle with a rim portion upon which a bird may perch and also having a rounded base portion that is weighted to bring the center of gravity close to said base and thereby delicately poise the feeder in a position in which a vertical line through its center of gravity is laterally offset with respect to said rim portion, and a retainer for said roly-poly in the form of a saucer provided with a substantially flat bottom upon which said roly-poly may rock and a marginal retaining rim with which said rounded bottom may have rolling engagement.

MABEL S. MEAKER.

REFERENCES CITED

The following references are of record in the file of this patent:

UNITED STATES PATENTS

| Number | Name | Date |
| --- | --- | --- |
| 701,121 | Xevers | May 27, 1902 |
| 1,380,889 | Farriss | June 7, 1921 |
| 1,394,669 | Da Costa | Oct. 25, 1921 |
| 2,458,306 | Schneider | Jan. 4, 1949 |

FOREIGN PATENTS

| Number | Country | Date |
| --- | --- | --- |
| 268,277 | Italy | Oct. 10, 1929 |